United States Patent [19]

Goldenberg et al.

[11] Patent Number: 5,681,131
[45] Date of Patent: Oct. 28, 1997

[54] CABLE FEEDING SYSTEM AND UMBILICAL CABLE THEREFOR

[75] Inventors: Andrew A. Goldenberg, Toronto; Pawel Kuzan; Jacek Wiercienski, both of Oakville; Daniel Meidan, Thornhill, all of Canada

[73] Assignee: The Consumers' Gas Company Ltd., Toronto, Canada

[21] Appl. No.: 503,888

[22] Filed: Jul. 18, 1995

[51] Int. Cl.$^6$ .............. B65H 59/20; B65H 75/18; H02G 1/08
[52] U.S. Cl. .............. 405/154; 405/156; 242/118.1; 242/407; 242/613; 254/134.3 R
[58] Field of Search .............. 405/154, 156; 254/134.3 FT, 134.3 R, 134.3 SC; 242/118.1, 407, 604, 604.1, 613

[56] References Cited

U.S. PATENT DOCUMENTS

| | | | |
|---|---|---|---|
| 4,454,999 | 6/1984 | Woodruff | 242/134.3 FT X |
| 4,986,314 | 1/1991 | Himmler | 138/97 |
| 5,044,824 | 9/1991 | Long et al. | 405/156 |
| 5,109,598 | 5/1992 | Koch | 29/825 |
| 5,139,751 | 8/1992 | Mansfield et al. | 405/154 X |
| 5,527,133 | 6/1996 | Csillag | 405/154 |

FOREIGN PATENT DOCUMENTS 77 35074  6/1978  France .

*Primary Examiner*—Tamara L. Graysay
*Assistant Examiner*—Tara L. Mayo

[57] ABSTRACT

A system for feeding a cable into a pipeline or other conduit comprises a rotating turret and a local cable feeding mechanism for drawing the cable off of the turret reel and loading it thereon. A remote cable feeding mechanism for inserting the cable into or withdrawing it from the pipeline is attached to a launch saddle secured to the pipeline, and its feeding rate is synchronized with that of the local cable feeding mechanism. Where the cable acts as an umbilical cable carrying fluids and electrical power to a tool inside the pipeline, the fluid and power supplies may be located on the floor of the reel, connected to an operator station by an electrical cable which winds onto and off of the turret shaft and is kept taut by a spring-biased tensioning arm. A flexible fibreglass rod extends through the cable to prevent coiling or bunching up within the pipeline while permitting the cable to traverse bends and corners.

16 Claims, 14 Drawing Sheets

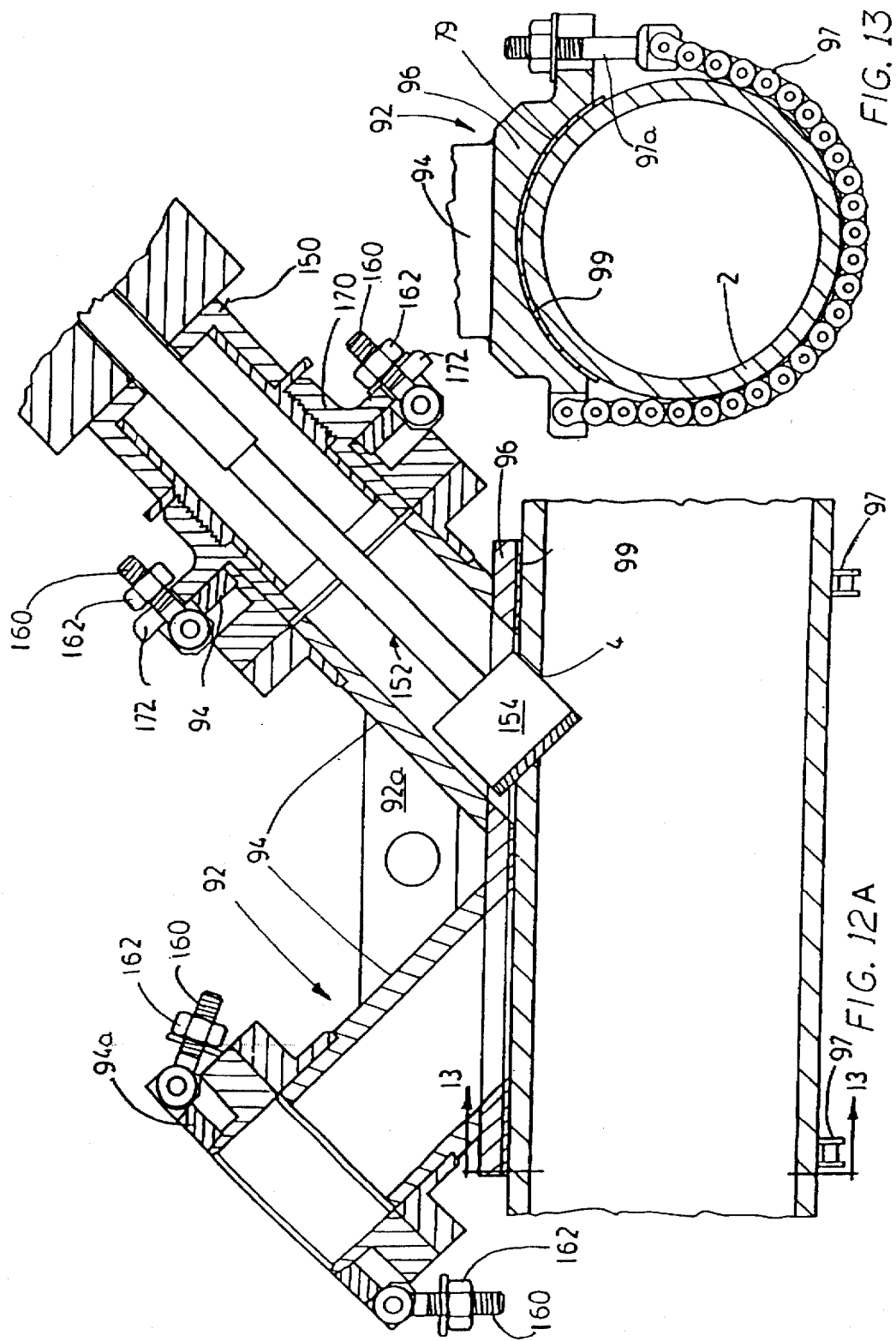

CABLE FEEDING SYSTEM AND UMBILICAL CABLE THEREFOR

FIELD OF THE INVENTION

This invention relates to a cable feeding system for feeding a cable through a conduit. In particular, this invention relates to a system for feeding a cable through a pipeline at a controlled rate over controlled distances, and an umbilical cable therefor for use with pipe inspecting or repairing tools.

BACKGROUND OF THE INVENTION

Devices which inspect and/or repair pipes internally are becoming more popular as an alternative to excavation, which can be costly, inconvenient and impractical. For example, such a device is disclosed in copending U.S. patent application Ser. No. 08/193,412 filed Feb. 7, 1994, which is incorporated herein by reference. The device includes a tool having a body supporting a working head and a video camera, which is fed through a pipeline to locate and repair leaking joints.

The tool is fed through a pipeline attached to the end of an umbilical cable, which contains the required wires and hoses that enable the tool to perform its various functions, the other end of which is connected to a master control station/operator interface panel located outside of the pipeline. The umbilical cable thus functions to both move the device along the pipeline and provide protection for the various electrical wires and fluid hoses, including hydraulic lines, required by the tool.

To efficiently operate such a tool, the umbilical cable must be fed into the pipeline in a controlled fashion, which allows the operator to know the approximate position of the tool within the pipe at any particular point in time and to thus locate pipe joints with minimal difficulty. The length of the cable can be 50 meters or longer, and its weight is significant because the cable contains all electrical wires and fluid hoses required by the tool, so manually feeding the tool through a pipeline can be difficult and inefficient. A mechanical feeding system provides a viable alternative, but any such system must feed the cable consistently and uniformly. To keep costs within reason the feeding system cannot be designed to recognize when the cable is not feeding properly and to respond accordingly as a person would.

Moreover, it is frequently impractical to dispense the cable immediately adjacent to the pipeline, especially where excavation is required to reach the pipeline. The cable unloading system must therefore be able to operate at a reasonable distance from the pipeline while the feeding system accurately feeds the cable into a small entrance opening, without the cable buckling or bunching up.

The umbilical cable itself must be flexible enough to bend around corners, particularly at the entrance opening to the pipeline which will usually be drilled through the side wall of the pipe. However, since the tool is not self-propelled, to stay within size and cost constraints, the cable must also be stiff enough that it does not compress, coil or bunch up inside the pipeline as the tool is being pushed along.

The umbilical cable jacket should be as light as possible, to minimize friction against the pipe interior, but it must be robust enough to protect the relatively delicate electrical wires and fluid lines contained within it. Because the cable must be long enough to feed through the pipeline over relatively large distances, in order to minimize the need to excavate to drill entry openings, it must be stored on a reel However, it is important that the cable not retain the shape of the storage reel when unrolled, as this would increase friction against the pipe and increase opportunities for coiling or bunching up within the pipe.

Many of these design parameters are conflicting, which presents a considerable problem in the design of an efficient umbilical cable for a tool of this nature.

The design of a storage reel also presents difficulties, because of the electrical and fluid lines required by the tool. For the tool to operate as it is being drawn off of the reel, electrical, gas and hydraulic fluid supplies must remain connected to the tool through the umbilical cable, even as the reel rotates. But to connect these supplies through the revolute joint of the reel is difficult and costly.

SUMMARY OF THE INVENTION

The present invention overcomes these problems by providing a feeding system for feeding a cable through a conduit, comprising a revolving turret having a reel on which the cable is stored. Attached to the base of the turret is a local cable feeding mechanism which feeds the cable to a remote cable feeding mechanism attached to a launch saddle affixed over an entry opening drilled into the conduit. The feeding rollers within each feeding mechanism are synchronized by drive chains and spur gears, and the two feeding mechanisms are synchronized with each other using encoders which monitor and measure the length of cable passing through each feeding mechanism and adjust the relative feeding rate of each feeding mechanism to compensate for any difference. This ensures consistent, uniform feeding of the cable through the conduit, even when the turret is positioned at a considerable distance from the conduit.

Most of the equipment and controls supplying fluids and electrical power through the cable are mounted on the reel itself, which avoids routing fluid hoses and wires through the revolute joint of the turret. An electrical cable containing electrical wires for both supplying power to the controls and equipment mounted on the reel and delivering signals to a stationary operator station, is wound around the turret shaft as the reel is loaded, and kept taut by a tensioning mechanism as the umbilical cable is dispensed from the reel, to avoid the need for slip rings.

The umbilical cable preferably comprises a non-braided polyethylene hose containing a solid pultruded fibreglass rod which prevents the hose from buckling or bunching up, but is sufficiently flexible to bend around corners in the pipe and ensure uniform feeding.

This feeding system is particularly useful for feeding through a pipeline an umbilical cable containing wires and/or hoses connecting a device, for example a tool for inspecting or repairing pipes, to an operator control station located outside of the pipeline. However, the invention may be used to feed any semi-rigid cable, hose, pipe, wire etc. through any type of conduit.

The present invention thus provides a cable feeding system for feeding a cable through a conduit, comprising a turret having a base and a reel rotatably mounted on the base, a local cable feeding mechanism mounted in a stationary position relative to the base for drawing the cable off of the reel, and a remote cable feeding mechanism spaced from the local cable feeding mechanism for feeding the cable into an opening in the conduit, whereby the local cable feeding mechanism and the remote cable feeding mechanism are synchronized to feed the cable at the same rate relative to one another.

The present invention further provides a cable containing wires and/or hoses connecting a device for use inside a conduit to an operator station located outside of the conduit, the cable comprising a jacket formed from flexible hose to protect the electrical wires and fluid hoses, and a stiffening rod extending through substantially the length of the cable to provide stiffness in the cable and thereby prevent the cable from buckling or bunching up in the conduit.

BRIEF DESCRIPTION OF THE DRAWINGS

In drawings which illustrate by way of example only a preferred embodiment of the invention, FIG. 12A is a cross-section of the launch saddle affixed to a pipe with the hole cutter adaptor attached, FIG. 13 is a cross-section of the pipeline with the launch saddle attached.

DETAILED DESCRIPTION OF THE INVENTION

Figure 1:
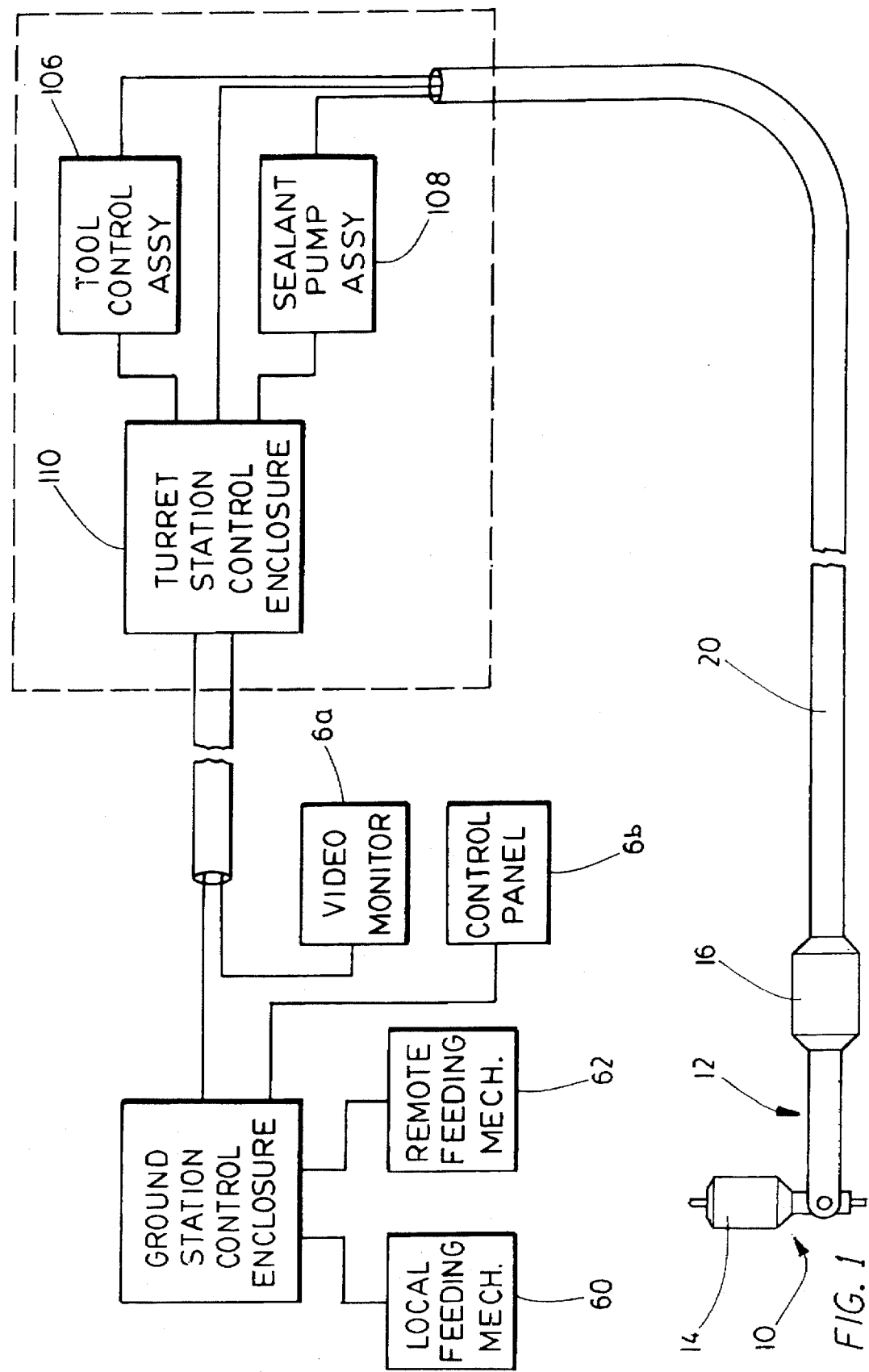
FIG. 1 is a schematic view of a pipe repairing device utilizing the umbilical cable of the invention.

FIG. 1 schematically illustrates the pipe repairing device disclosed and claimed in copending U.S. patent application Ser. No. 08/193,412, which is incorporated herein by reference. The tool 10 comprises a body 12 having a pivotable working head 14 for drilling into the wall of a cast iron pipe 2 at a bell and spigot pipe joint 3 and injecting a sealant into the space between the bell and the spigot, to repair any leaks at the joint 3. A ground operator station 6 having a video monitor 6a and a control panel 6b controls the various electrical functions of the tool 10, including a miniature video camera 16 mounted on the tool body, and also controls fluid sources for a sealant pump system and hydraulic pivoting and drillhead mechanisms, as further described below. The pipe repairing device is fully described in copending U.S. patent application Ser. No. 08/193,412.

Figure 17:
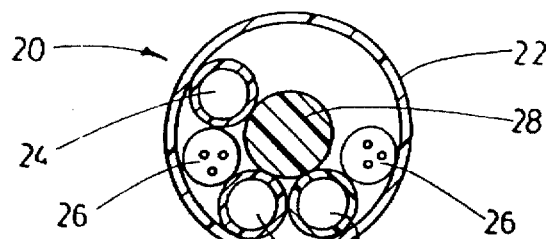
FIG. 17 is a cross-section of the umbilical cable.
Figure 12B:
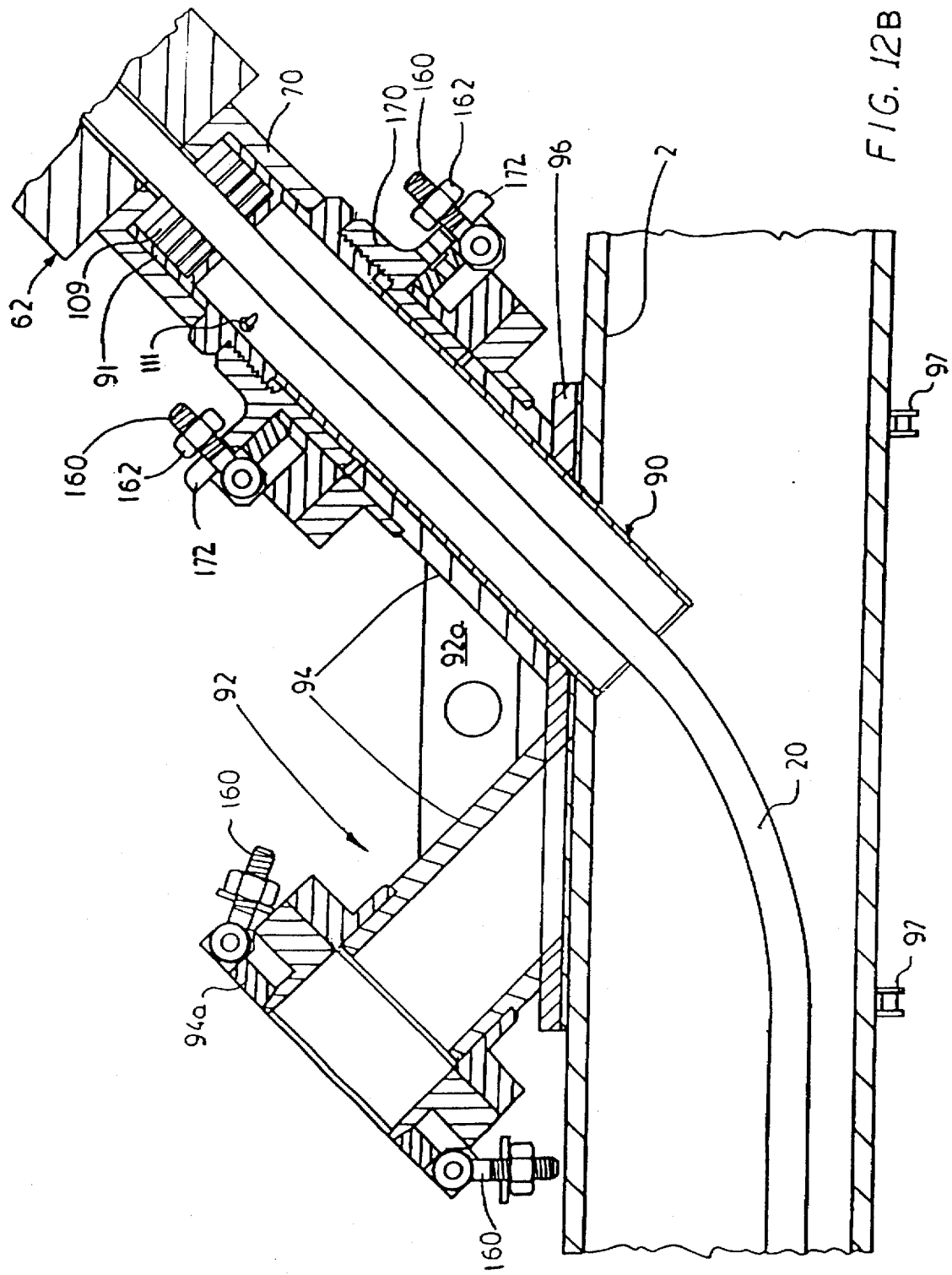
FIG. 12B is a cross-section of the launch saddle affixed to a pipe with the tool launch adaptor attached.

The umbilical cable 20 contains all hoses 24 and electrical wires 26 which enable the tool to perform its functions. The umbilical cable 20, shown in cross-section in FIG. 17, comprises a jacket 22 formed from 1.25" OD/1" ID non-braided clear polyethylene hose which is smooth, flexible and sufficiently thick to protect the fluid hoses 24 and electrical wires 26 contained within it. A ⅜" pultruded fibreglass rod 28 extends through substantially the length of the cable 20, to provide sufficient stiffness in the cable 20 to prevent buckling or bunching up in the pipe 2, while allowing sufficient flexibility to allow the cable 20 to bend at the pipe entrance (as seen in FIG. 12B) and around any corners or bends within the pipeline 2.

Figure 2:
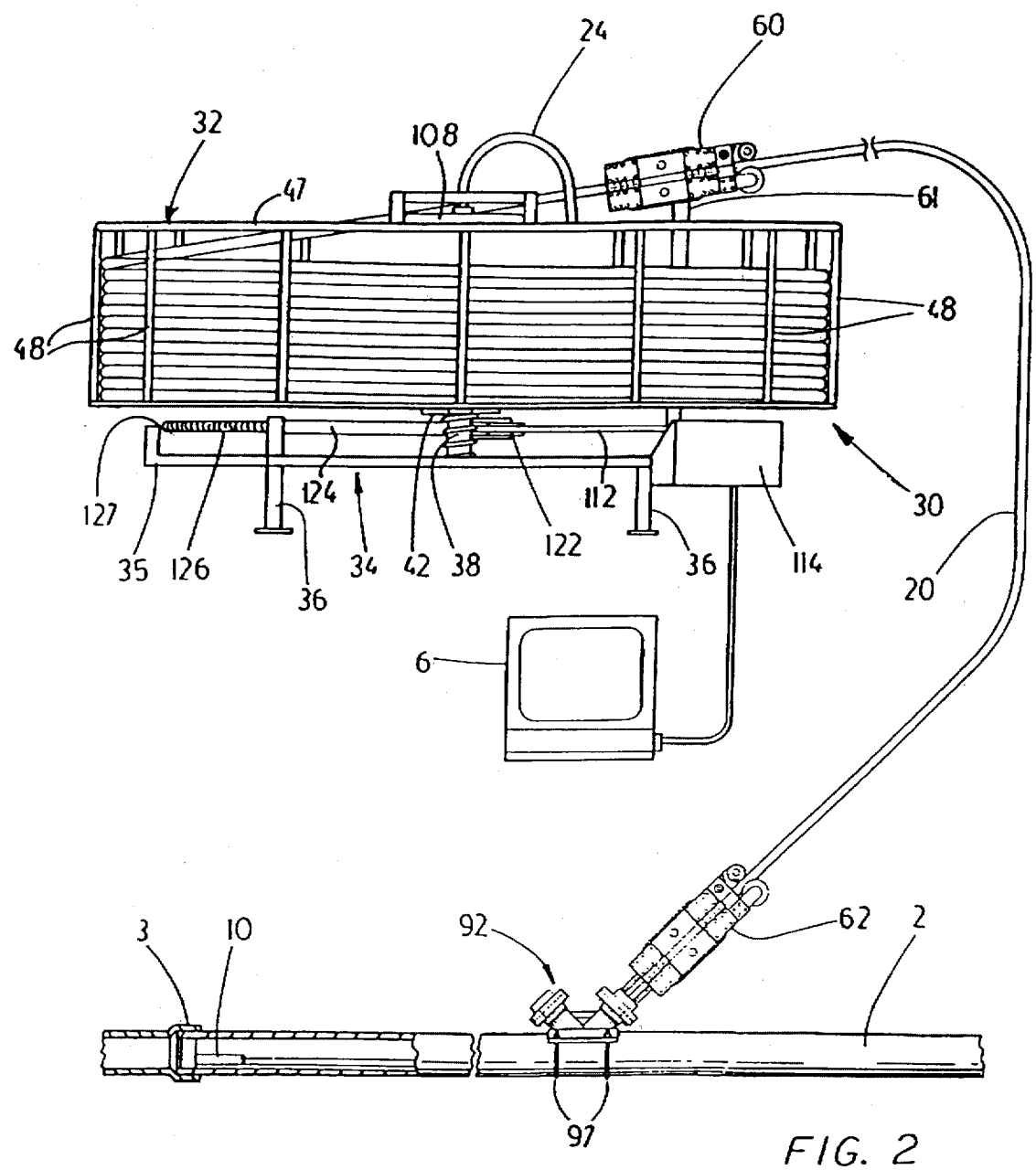
FIG. 2 is a side elevation of the feeding system of the invention.

The cable feeding system of the invention, suitable for feeding a cable such as the umbilical cable 20 through a pipeline or other conduit, is illustrated in FIG. 2. The system includes a turret 30 comprising a rotating reel 32 mounted on a base 34, a local cable feeding mechanism 60 mounted on a post 61 affixed to the base 34 and a remote cable feeding mechanism 62 for attachment to the entry opening 4 in the pipe 2 in the manner described below.

The base 34 of the turret 30 has a frame 35 composed of metal tubing, preferably rectangular tubing to facilitate the attachment of turret components, with legs 36 relatively uniformly disposed about the frame 35 to raise the frame slightly (which can be advantageous on rough or uneven ground) and spaced apart sufficiently to ensure stability when the reel 32 is in motion. The turret reel 32 is rotatably mounted on a turret shaft 38 about generally the centre of the base 34 so that the reel 32 rotates freely on the base 34. For the umbilical cable 20 described above the minimum reel diameter should be approximately six feet (1.8 m); more flexible cables will permit a smaller reel 32 to be used.

Figure 3:
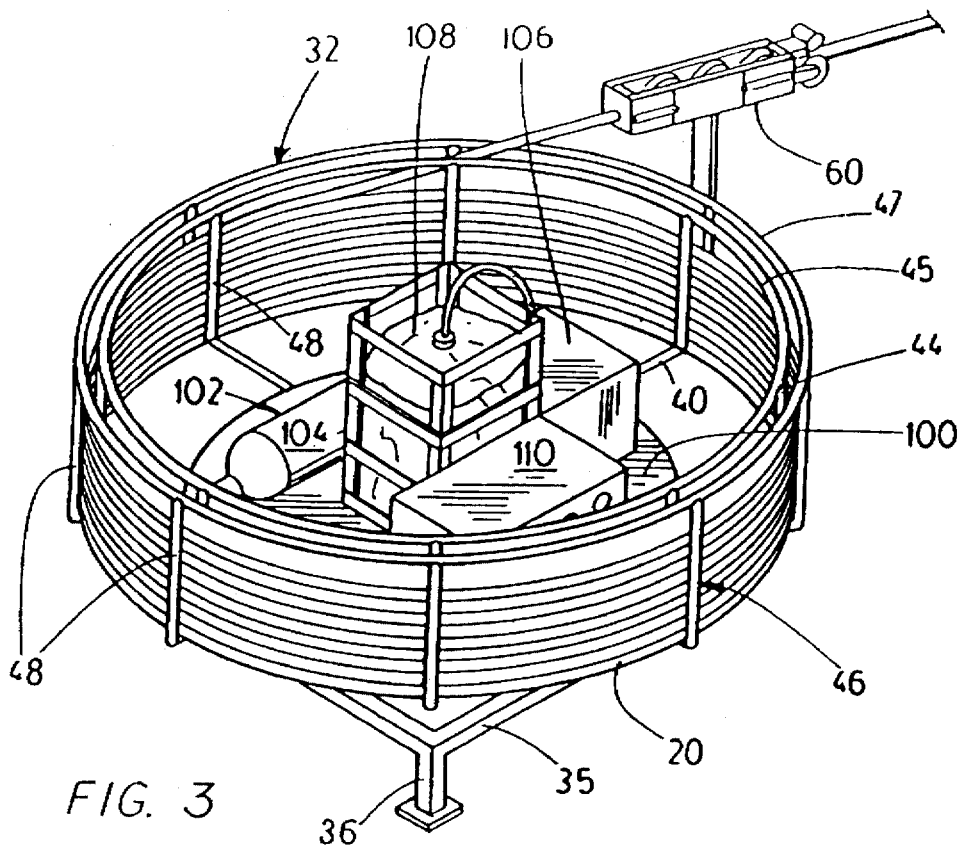
FIG. 3 is a perspective view of the turret for the cable feeding system of FIG. 2.
Figure 4:
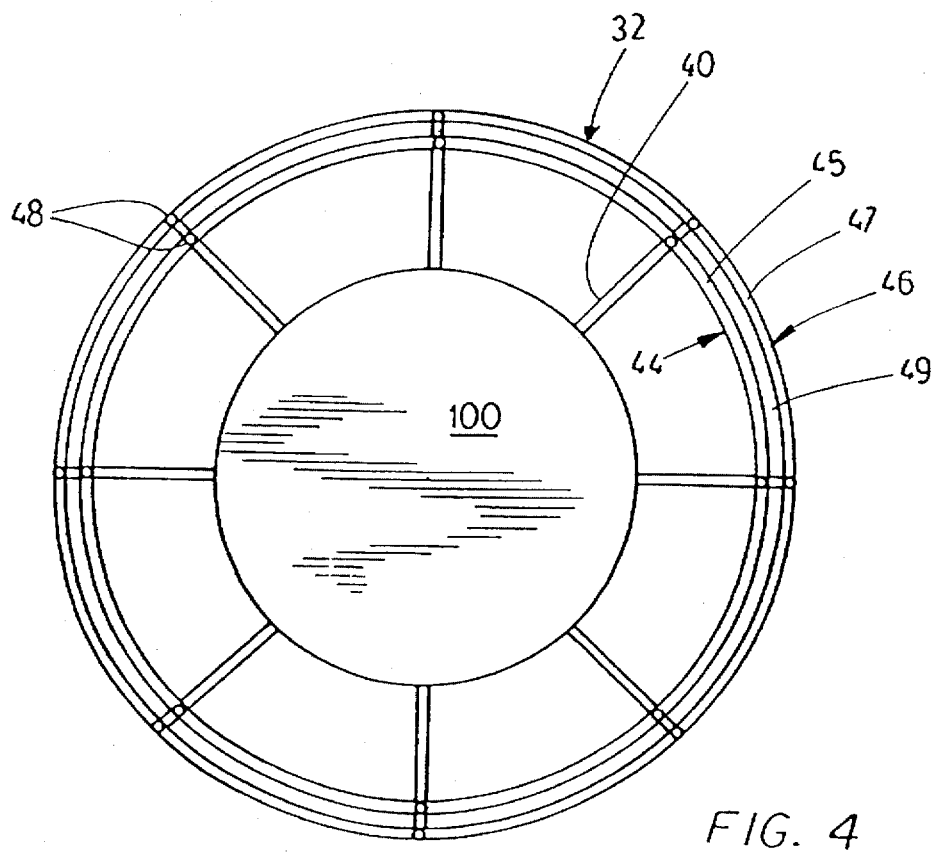
FIG. 4 is a top plan view of the reel for the turret of FIG. 3.
Figure 5:
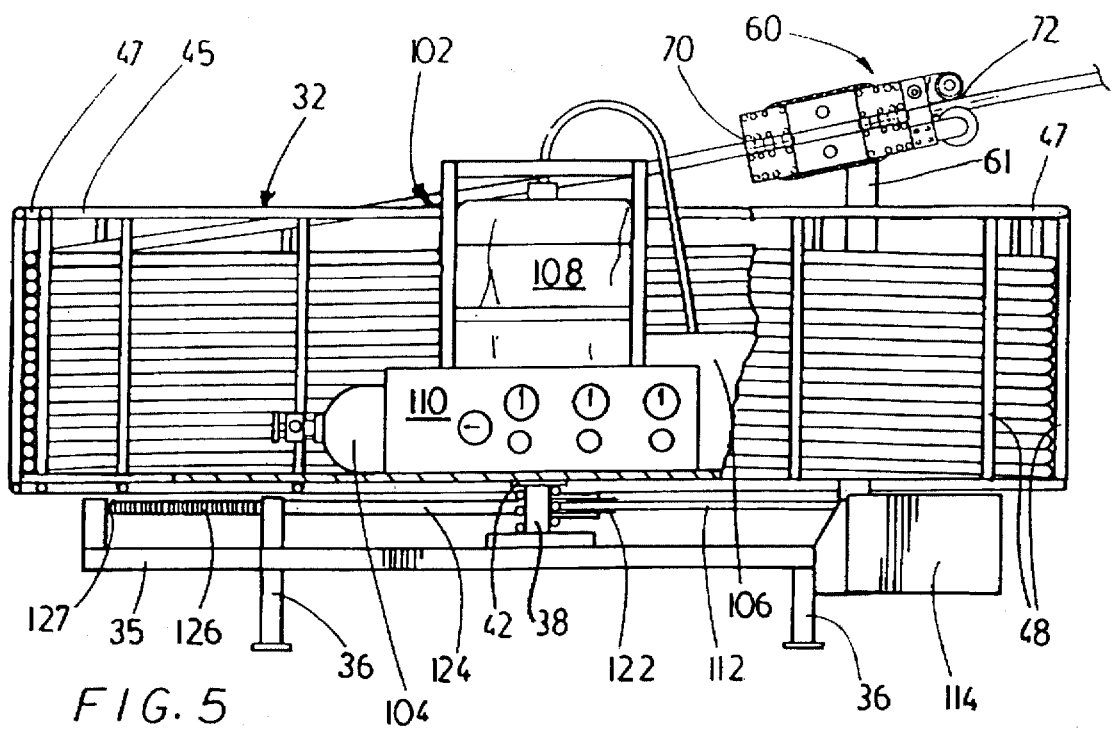
FIG. 5 is a partially cutaway side elevation of the turret of FIG. 3.

The reel 32, best seen in FIGS. 3 to 5, may be formed from metal tubing, preferably cylindrical tubing to minimize the contact area between the reel 32 and the cable 20 and thus minimize friction when the cable 20 is being loaded onto the reel or dispensed therefrom, and without any sharp corners on which the cable 20 could snag. Radial spokes 40 (seen in FIG. 4) extend from a central hub 42 supported by the turret shaft 38 and form an open floor for the reel 32.

The spokes 40 support inner and outer fences 44, 46, respectively, spaced apart radially, each formed from tubular posts 48 extending generally orthogonally to the spokes 40 and welded or otherwise affixed thereto. Each fence 44, 46 has a circular top rail 45, 47, respectively, also formed from cylindrical tubing and welded or otherwise affixed to the posts 48, to maintain both the spacing between and the generally vertical orientation of the posts 48, and to provide a smooth surface for the loading and dispensing of the cable 20.

The fences 44, 46 are spaced apart a distance slightly greater than the diameter of the cable 20, as seen in FIG. 4, but in any event less than two cable diameters, forming an annular channel 49 into which the cable 20 is loaded. This ensures that as the cable 20 is loaded onto the reel 32 it will overlay itself only axially relative to the reel 32, as shown in FIG. 5, not radially, to prevent the cable 20 from entangling or interfering with underlying cable layers as it is being dispensed from the reel 32. Thus, as the cable 20 is loaded onto the reel 32 each successive layer falls on top of the previous cable layer, and as such when dispensed the uppermost layer of cable 20 is always unobstructed.

The cable 20 is dispensed and loaded onto the reel 32 by a local cable feeding mechanism 60 mounted on a post 61 welded or otherwise affixed to the turret base 34 at a level slightly higher than the top rails 45, 47. The local cable feeding mechanism 60 has a first end 70 and a second end 72, and is mounted at an attitude such that the first end 70 faces slightly downwardly toward the reel 32, as shown in FIG. 5, to minimize bending of the cable 20 as it is dispensed. The local cable feeding mechanism 60 may if desired be adjustably mounted, to allow for adjustment of its direction and attitude relative to the reel 32.

The local cable feeding mechanism 60, illustrated in detail in FIGS. 8 to 11, comprises a hinged frame 74 containing parallel sets of upper and lower feeding rollers 76 mounted on roller shafts 73 supported by the frame 74. The upper and lower sets of rollers 76 are spaced apart a distance approximately equal to the diameter of the cable 20, to provide a frictional engagement between the rollers 76 and the jacket 22 of the cable 20 without deteriorating the cable jacket 22. The rollers 76 are thus preferably composed of rubber or a similar resilient material which provides good frictional engagement, or may be metal or plastic rollers provided with a resilient frictional surface such as rubber to engage the cable jacket 22 during dispensing and loading operations. The frame 74 is hinged at 75 and removable securing means such as bolts 77 (seen in FIG. 9) are provided, so that the frame 74 can be swung open for insertion of the cable 20 and then locked closed for use.

Figure 8:
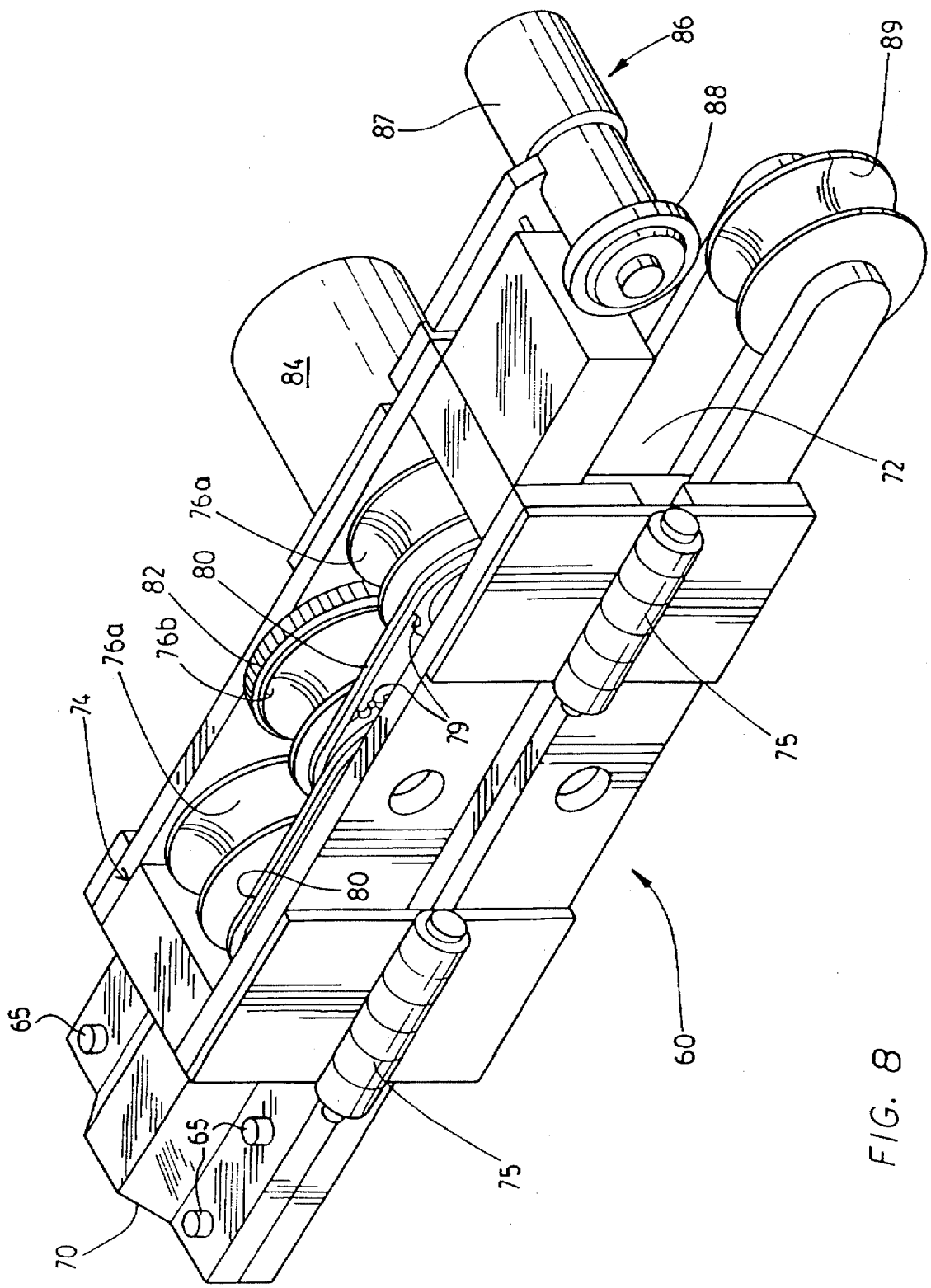
FIG. 8 is a perspective view of the local cable feeding mechanism.
Figure 9:
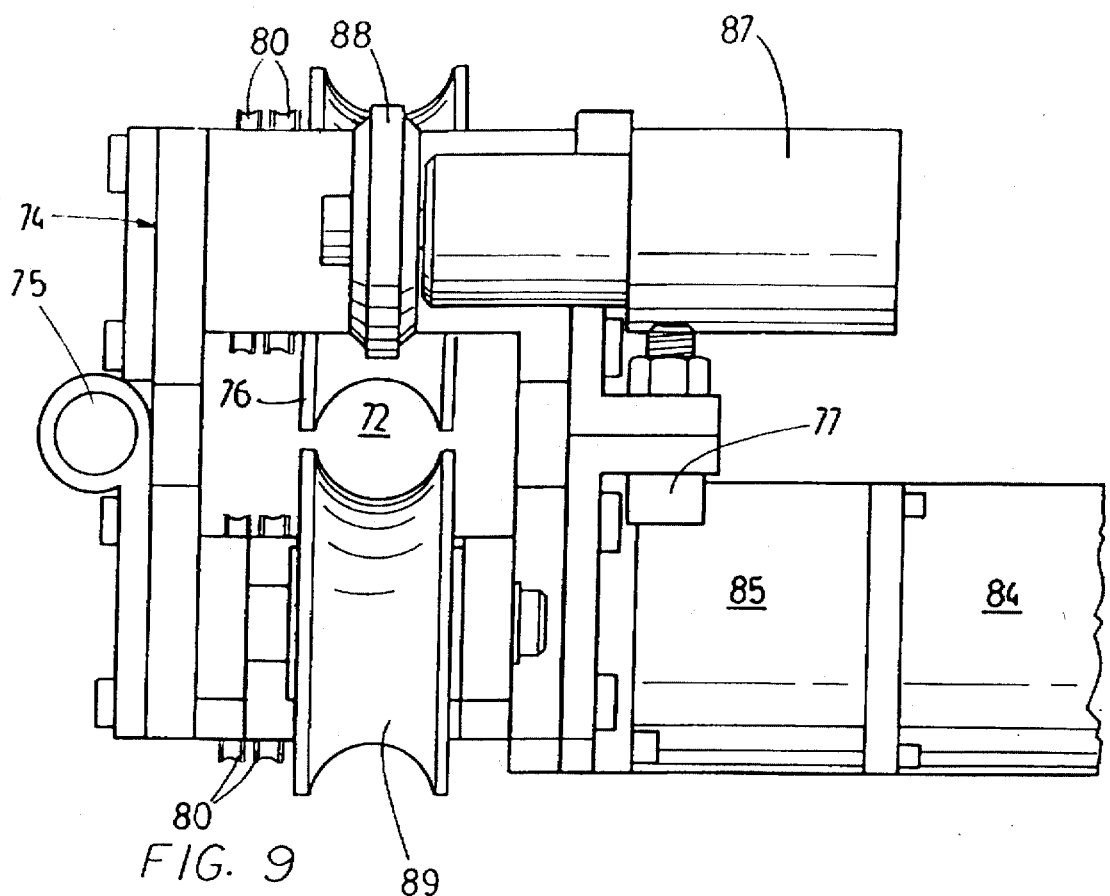
FIG. 9 is an end elevation of the feeding mechanism of FIG. 8.
Figure 10:
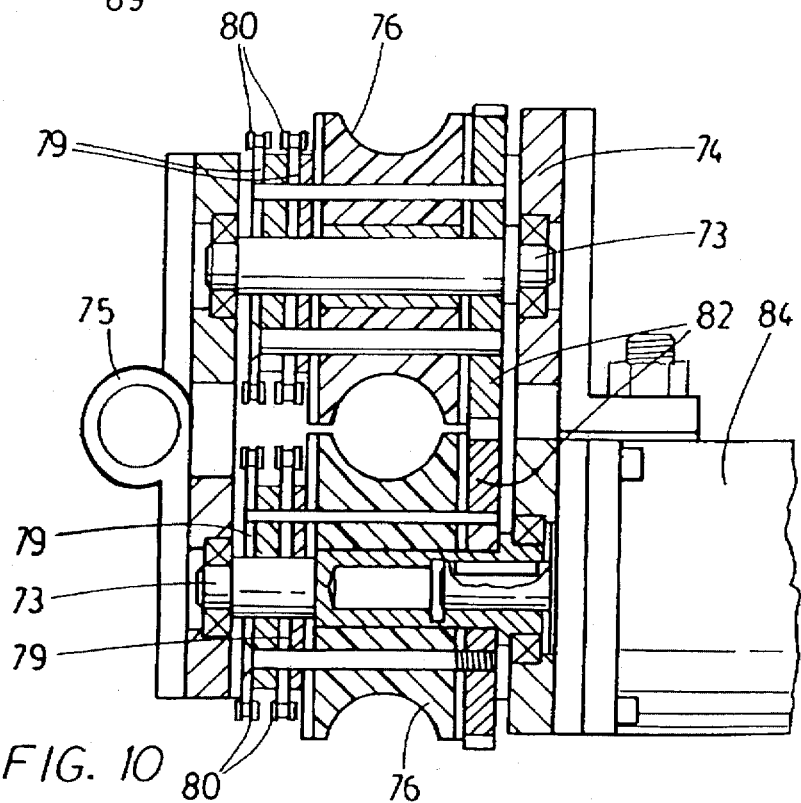
FIG. 10 is a cross-section of the feeding mechanism of FIG. 8.
Figure 11:
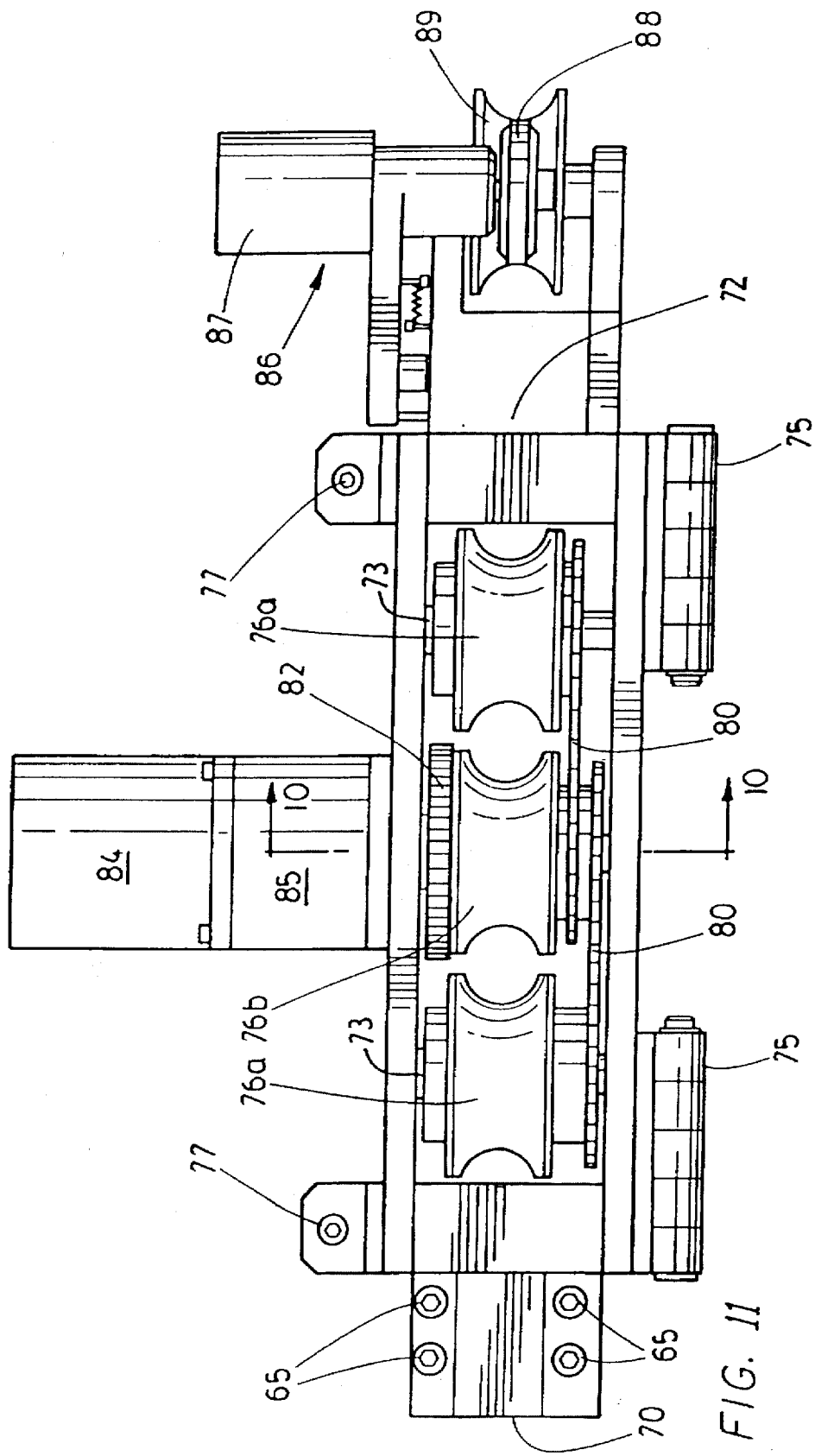
FIG. 11 is a top plan view showing the roller arrangement in the feeding mechanism of FIG. 8.

The feeding rollers 76 within each set are aligned in the direction of feeding. As seen in FIGS. 8 and 11, in both the upper and lower sets of rollers 76 each end roller 76a is provided with a sprocket 79 and the middle roller 76b is provided with two sprockets 79, the feeding rollers 76 of each set being thereby interconnected by transmission chains 80 with the other rollers 76 of the same set, so that their rates of rotation are synchronized. The lower set of rollers 76 is in turn synchronized with the upper set of rollers 76 by spur gears 82 meshing between one roller 76 of each set, being the middle roller 76b in the preferred embodiment illustrated. A suitable electric motor or other drive means, in the embodiment illustrated a DC servo motor 84 coupled to a gearbox 85, drives one of the rollers 76 of the lower set directly, and the other rollers 76 in the lower set are driven by the transmission chains 80. The upper set of rollers. 76 is in turn driven at the same rate, in the opposite direction, by the meshing of the spur gears 82. It will be appreciated that it is immaterial which roller 76 is driven by the motor 84, or which roller 76 is provided with a spur gear 82 so long as the same roller 76 of the other set is so equipped.

Attached to the frame 74 is means for measuring the cable length, comprising an incremental optical encoder 86 mounted in an aluminum enclosure 87 with a free-wheeling rubber or rubber-edged wheel 88 that engages the cable 20 just beyond the second end 72 of the local cable feeding mechanism 60. The wheel 88 turns as the cable 20 passes through the second end 72, and the length of cable 20 passing through the local cable feeding mechanism 60 is thus measured by the optical encoder 86. A biasing roller 89 affixed to the frame 74 serves to ensure good frictional engagement between the wheel 88 and the cable jacket 22. The measuring means enables accurate power insertion and synchronization of the feeding rates as between the local and remote cable feeding mechanisms 60, 62, as described below.

The remote cable feeding mechanism 62 is mounted on the end of a tool launch adapter 90, shown in FIGS. 7 and 12, attached to the launch saddle 92 which is clamped to the pipe 2 before the entry opening 4 is drilled, as described below. The launch saddle 92 comprises at least one entry pipe 94 welded or otherwise affixed to a base plate 96, preferably at approximately a 45 degree angle relative to the base plate 96. The entry pipe 94 contains a conventional 3" medium pressure vane-type valve 93 (see FIG. 7) for closing off the entry pipe 94. The hole cutter adaptor 150, for engaging a drilling mechanism to cut the entry opening 4 (see FIG. 12A), and the tool launch adaptor 90, for engaging the remote cable feeding mechanism 62 to the launch saddle 92 for feeding the cable 20 into the pipeline 2 (see FIG. 12B), are each provided with an adaptor plate 170, for alternately attaching the hole cutter adaptor 150 or the tool launch adaptor 90 to the launch saddle 92, as described below.

A pair of chains 97 secured to tensioning bolts 97a clamps the base plate 96 to the pipe 2, as seen in FIG. 13, usually in an upright orientation but circumstances may dictate otherwise. Preferably the launch saddle 92 is provided with two oppositely-directed entry pipes 94 which may be reinforced by a brace 92a extending therebetween, as in the example illustrated in FIGS. 7 and 12, which allows repair operations to be effected in either direction along the pipeline 2 without reorienting the launch saddle 92.

Figure 7:
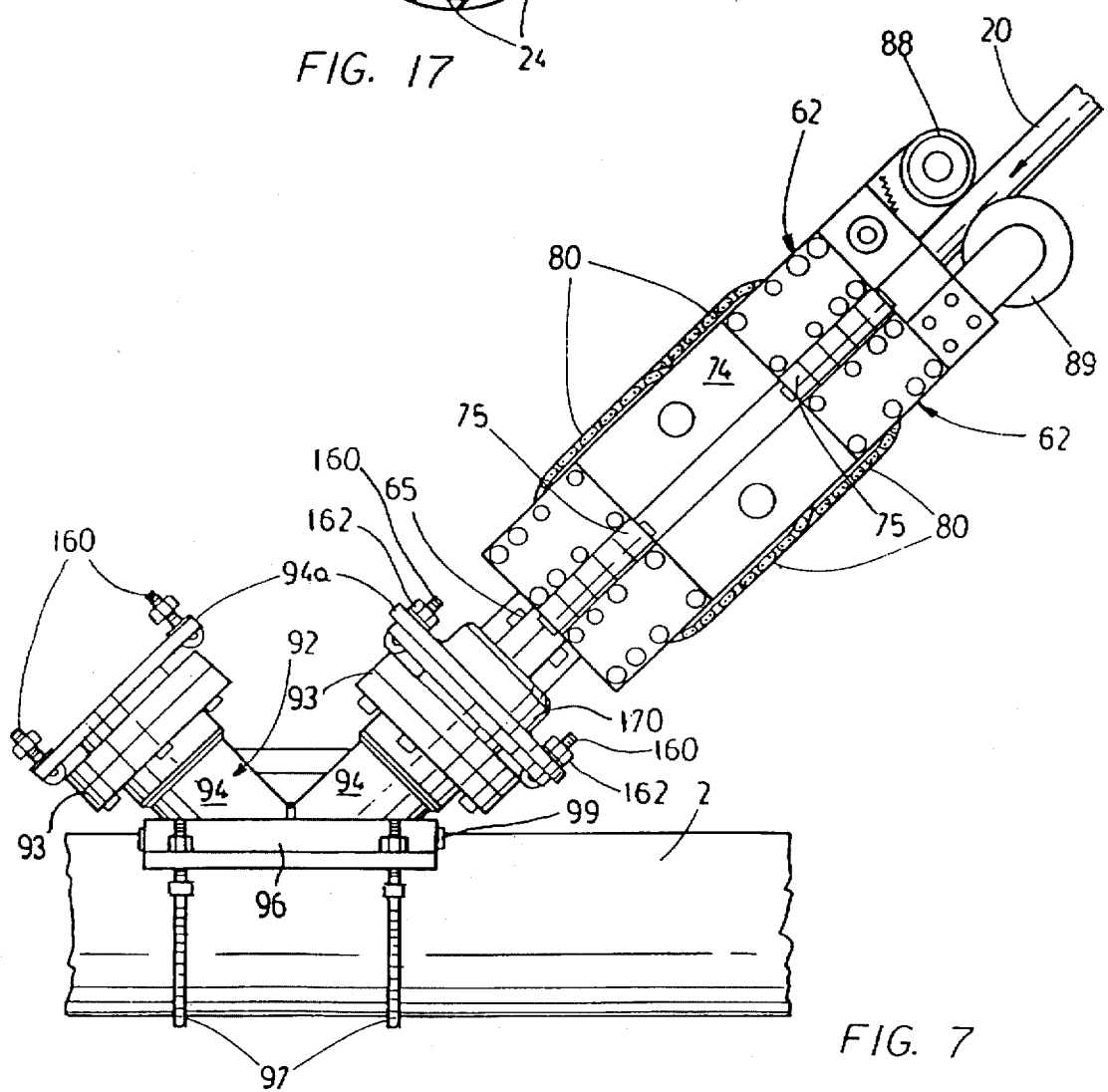
FIG. 7 is a side elevation of the launch saddle showing the remote cable feeding mechanism attached.

The remote cable feeding mechanism 62, illustrated in FIG. 7, is essentially identical to the local cable feeding mechanism 60. Its first end 70 serves as a receptacle which slips over the exposed end 91 of the tool launch adapter 90 as shown in FIGS. 7 and 12B, and the bolts 65 at the first end 70 of the frame 74 are tightened to engage the remote cable feeding mechanism 62 to the tool launch adapter 90. The adaptor plate 170 of the tool launch adapter 90 is in turn coupled to the flange 94a of the entry pipe 94 such that the remote cable feeding mechanism 62 is in direct alignment with the entry opening 4. The remote cable feeding mechanism 62 is provided with an optical encoder 86 affixed to the frame 74 just beyond the second end 72 of the remote cable feeding mechanism 62, as in the local cable feeding mechanism 60, to measure the cable 20 as it enters the remote cable feeding mechanism 62 and is fed into the pipeline 2.

Figure 16A:
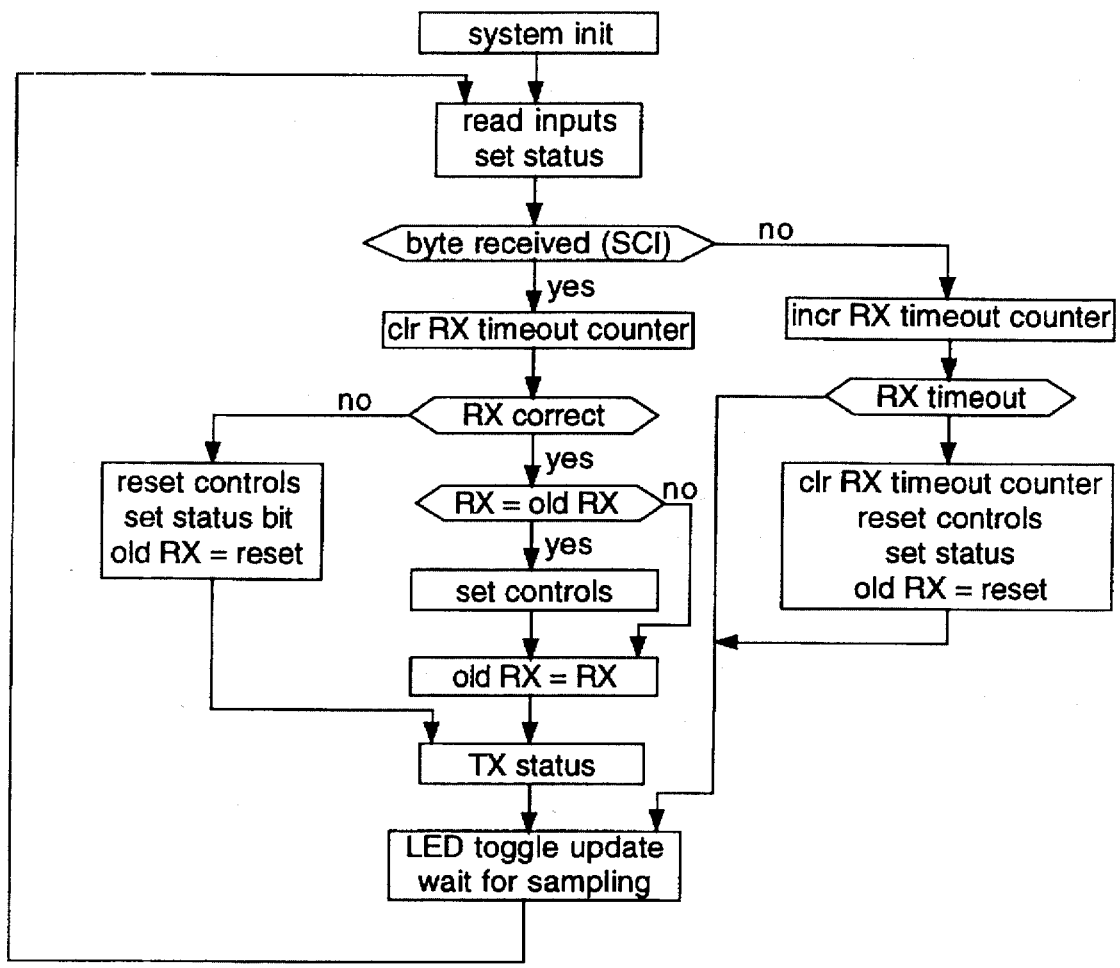
FIGS. 16A and 16B are flow charts showing the operation of the operator station software.
Figure 16B:
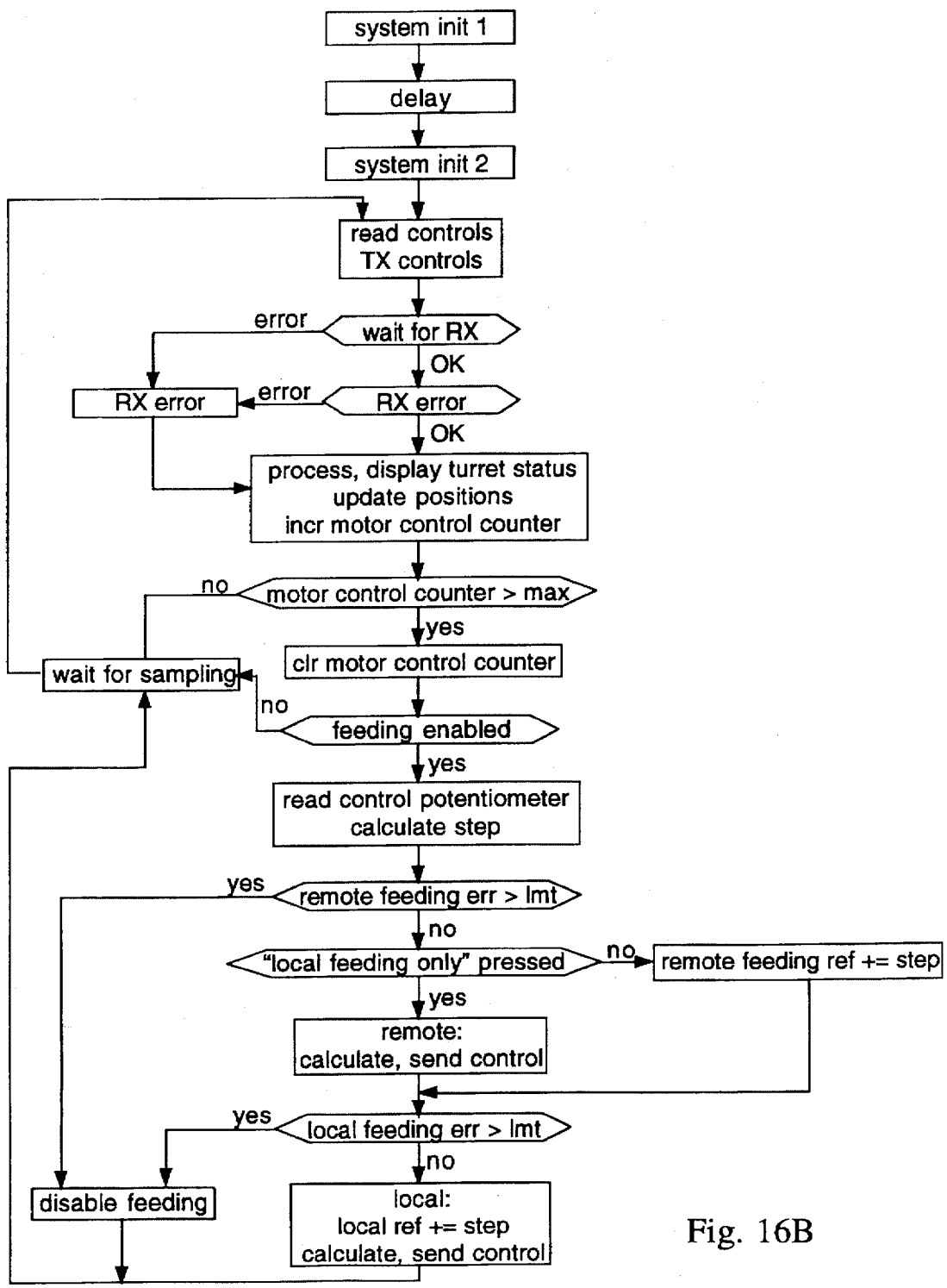

The feeding rate of the remote cable feeding mechanism 62 is synchronized with the feeding rate of the local cable feeding mechanism 60 by conventional software, located in the ground operator station 6, which compares the speed signals returned by the respective encoders 86 and adjusts the speed of the respective drive motors 84 accordingly. The operation of this software is shown in the flow charts of FIGS. 16A and 16B.

A tool 10 such as that described in copending U.S. patent application Ser. No. 08/193,412 requires electrical cables 26, to power the drill motor, lights and video camera 16; hydraulic fluid hoses 24 to drive the hydraulic systems used by the tool 10; and one or more sealant hoses 24 for effecting the repair of leaks. To avoid routing the various wires 26 and hoses 24 through the revolute joint of the turret 30, a platform 100 is welded or otherwise affixed to the turret floor, and equipment supplying the various wires 26 and hoses 24 (generally designated 102 in FIG. 3) is secured to the platform 100 and rotates with the reel 32. For the pipe repair tool 10 referred to above the equipment 102 includes a nitrogen bottle 104 and tool control assembly 106, one or more sealant pump assembly/sealant reservoirs 108, and an electrical control enclosure 110 which contains all tool control interfaces, video camera interfaces and power supply interfaces.

Thus, the tool 10 is attached to one end of the umbilical cable 20, and the other end of the umbilical cable 20 is attached to the floor of the turret reel 32 within or immediately adjacent to the annular channel 49 formed between the two fences 44, 46. The various wires 26 and hoses 24 contained within the umbilical cable 20 are connected directly to the fluid and power supplies 102 located on the platform 100. Since these rotate with the reel 32 as the cable 20 is dispensed, the problem of wires or hoses twisting during loading or unloading of the cable 20 is avoided.

Figure 6:
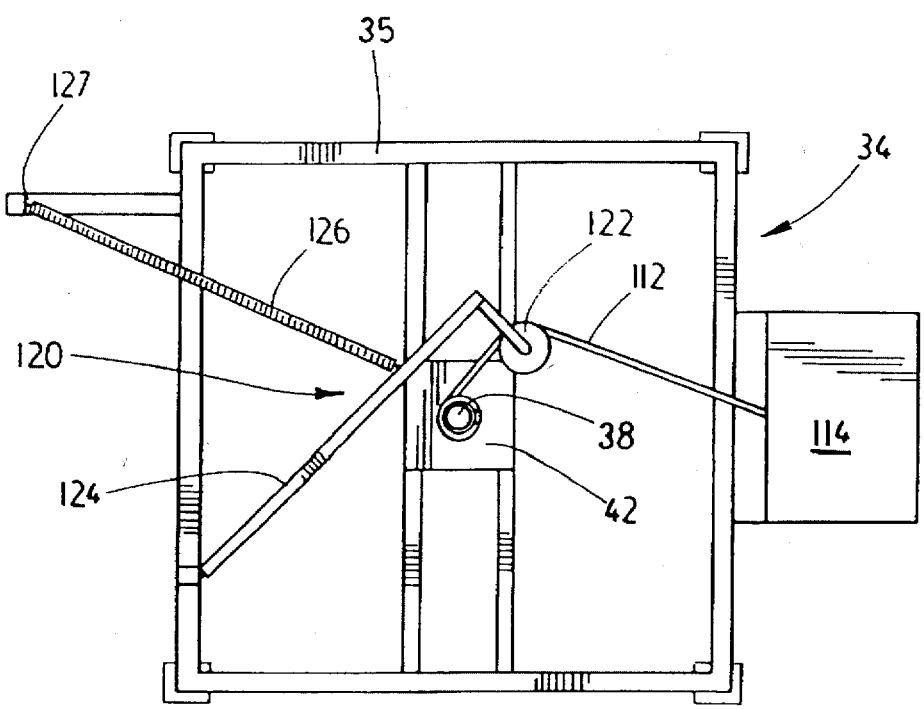
FIG. 6 is a top plan view of the base of the turret of FIG. 3.

Electrical power is supplied to a turret control station on the platform 100, contained in electrical control enclosure 110, and signals are supplied therefrom to the ground operator station 6, through an electrical cable 112, shown in FIGS. 5 and 6, which contains all AC power lines, serial communication lines and a coaxial video cable 6c. The operator station 6 is stationary and positioned at any convenient location near the turret assembly 30, and includes the control system for the power feeding mechanisms 60, 62 and a control panel 6b for controlling the various functions of the tool 10 as described in U.S. patent application Ser. No. 08/193,412.

Figure 14:
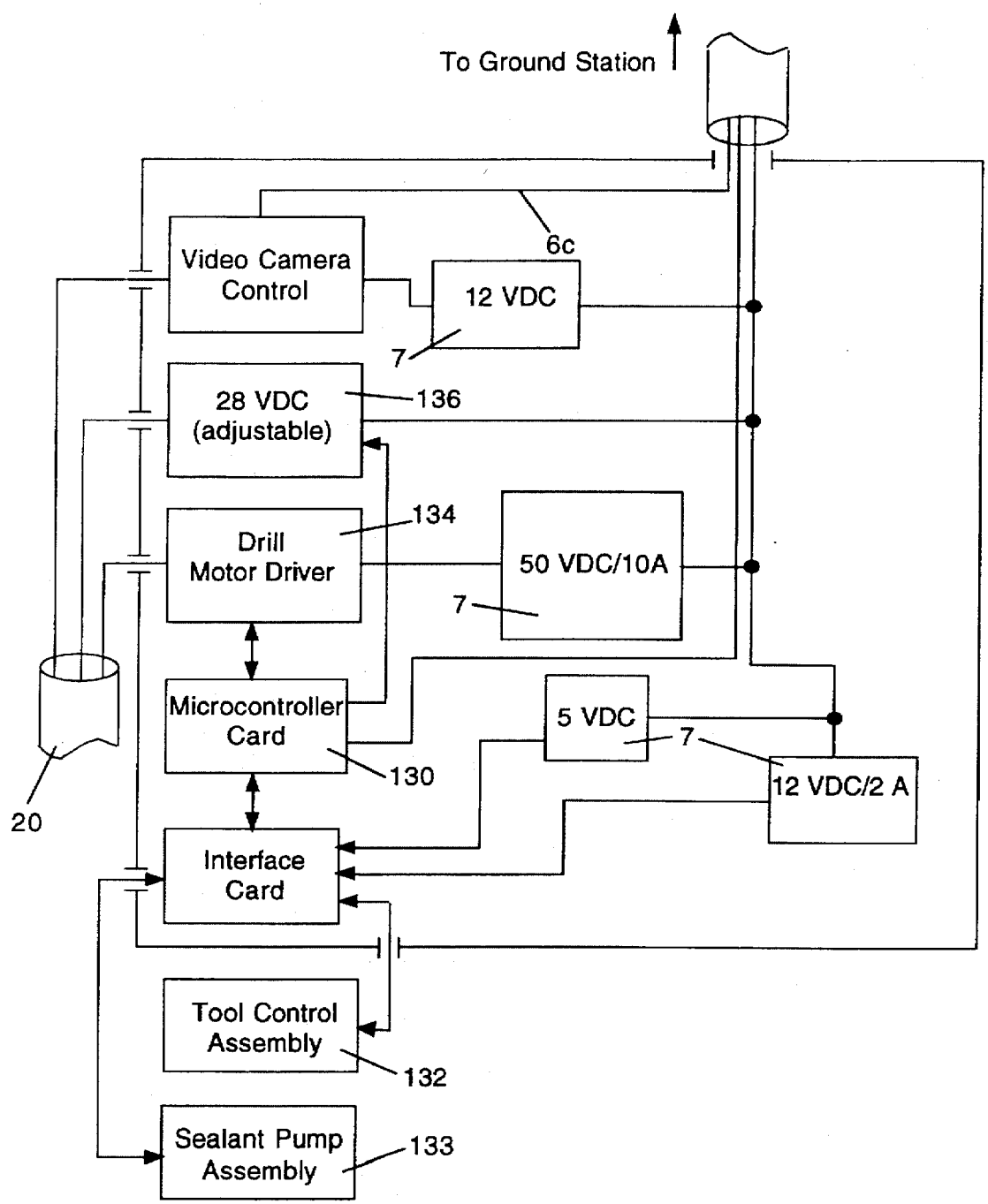
FIG. 14 is a block diagram showing the components of the turret control station.

FIG. 14 shows the control components of the turret control enclosure 110. A Motorola MC68HC11 based microcontroller card 130 activates the tool control and sealant pump solenoid valves 132, 133, tool motor power driver 134 and lighting system power supply 136. The microcontroller card 130 reads conventional tool control sensors, sealant pump sensors and the drill motor current monitoring signal, and communicates with the ground operator station 6 over an RS-232 serial line. All application-specific interfaces use conventional circuitry/software located in the electrical control enclosure 110.

Figure 15:
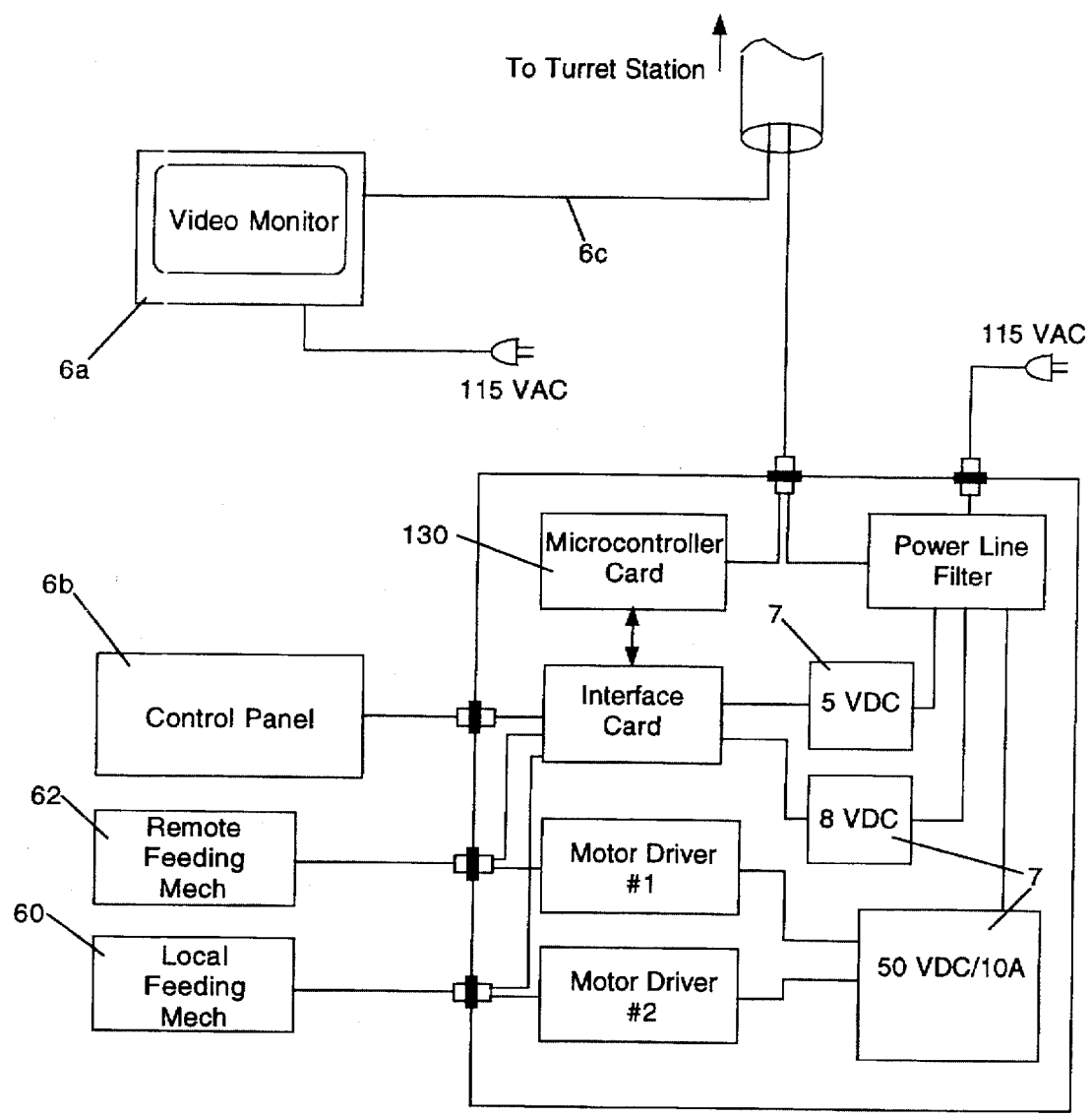
FIG. 15 is a block diagram showing the components of the ground operator station and control panel.

The controls for the ground operator station 6, shown in FIG. 15, are similarly microcontroller based. The microcontroller 130 reads data from and writes data to interface circuitry contained in the control panel 6b. Specialized interfaces communicate with the turret station processor, read the status of all switches and dials, activate the LED indicators on the control panel 6b, and monitor and control the cable feeding mechanisms 60, 62 in real time.

To avoid using slip rings, which tend to be expensive and unreliable in many situations, the cable tensioning mechanism 120 shown in FIG. 6 is provided to make the necessary electrical connections between the electrical control enclosure 110 on the turret platform 100 and the ground operator station 6. This permits the electrical cable 112 to be wound around the turret shaft 38 as the umbilical cable 20 is loaded onto the reel 32, yet the electrical cable 112 remains taut as the umbilical cable 20 is dispensed from the reel 32. The turret end of the cable 112 extends down through the platform 100 and is wound around the turret shaft 38, as seen in FIG. 2. The other end of the cable 112 connects to extension cables at a junction box 114 attached to one side of the turret base frame 35, which connect the cable 112 to the operator station 6.

As best seen in FIG. 6, between the turret shaft 38 and the junction box 114 the cable 112 runs through a pulley 122 at the end of an arm 124 biased by a tension spring 126 attached to the frame 35 at 127. The arm 124 thus bears away from the turret shaft 38, supporting the cable 112 and keeping the cable 112 taut as it unwinds from the shaft 38 when the umbilical cable 20 is dispensed. When the tool 10 is being withdrawn from the pipeline 2 and the umbilical cable 20 is being loaded back onto the reel 32, the arm 124 yields and is drawn toward the turret shaft 38 by the tension created on the electrical cable 112 as it is wound onto the turret shaft 38. The maximum number of turns of the electrical cable 112 around the turret shaft 38 must therefore be at least the same as, and should preferably slightly exceed, the maximum number of turns of the umbilical cable 20 around the reel 32.

In operation, a portion of the pipeline 2 to be inspected or repaired is exposed. The launch saddle 92 is fitted with a rubber gasket 99 beneath the base plate 96, to prevent leakage of gas between the launch saddle 92 and the pipe 2, and the saddle 92 is clamped to the pipe 2 by wrapping the chains 97 around the pipe and tightening the tensioning bolts 97a, as shown in FIG. 13.

As can be seen in FIGS. 12A and 12B, to facilitate attachment and removal of the hole cutter adaptor 150 and the tool launch adaptor 90 each entry pipe 94 terminates at its upper end in a flange 94a provided with a pair of opposed pivoting bolts 160, seen in the uncoupled position on the left-hand pipe 94 and in the coupled position on the right-hand pipe 94. The adaptor plate 170 attached to each of the hole cutter adaptor 150 and the tool launch adaptor 90 has a configuration complimentary to the flange 94a and opposed slots 172 into which the bolts 160 swing, so that when the nuts 162 are tightened the adaptor plate 170 is securely engaged to the flange 94a and the hole cutter adaptor 150 or the tool launch adaptor 90, as the case may be, is properly aligned with the entry pipe 94.

The hole cutter adapter 150, shown in FIG. 12A, supporting a 3" carbide-tipped long-stroke hole cutter 152 with a cutting head 154, is thus attached to the launch saddle 92 by coupling the adaptor plate 170 to one of the entry pipes 94, swinging the bolts 160 into position in the slots 172 and tightening the nuts 162. A pneumatically driven drilling device (not shown) is engaged to the hole cutter 152 and activated to cut the 3" entry opening 4 through the pipe wall at 45 degrees (following the angle of the entry pipe 94).

Once the entry opening 4 has been drilled the hole cutter adaptor 150 is detached from the launch saddle 92 by loosening the nuts 162 and swinging away the bolts 160 to detach the adaptor plate 170. The tool launch adapter 90, as shown in FIG. 12B a hollow pipe with a smooth interior and rounded lower edge which extends through the adaptor plate 170, is then coupled to the launch saddle 92 in similar fashion. The vane-type valve 93 is closed to prevent gas from escaping during this part of the procedure.

The tool launch adapter 90 both protects the tool 10 during launching and withdrawal and its rounded lower edge protects the jacket 22 of the umbilical cable 20 from rubbing against the sharp edges of the entry opening 4. The exposed end 91 of the tool adapter 90 projects out of the entry pipe 94. As seen in FIG. 12B, the tool adapter 90 contains resilient umbilical cable seals 109 in the form of O-rings to prevent leakage of gas during the inspection/repair operation, and a limit switch 111 for reasons described below.

The umbilical cable 20 is engaged into the local cable feeding mechanism 60 and the remote cable feeding mechanism 62 by removing the bolts 77, swinging the frame 74 open, laying the cable 20 over the lower set of feeding rollers 76, closing each frame 74 and replacing the bolts 77. The first end 70 of the remote cable feeding mechanism 62 is then inserted over the exposed end 91 of the tool launch adapter 90 and the bolts 65 are tightened to secure the remote cable feeding mechanism 62 in place.

The system is powered up at the ground operator station 6, and the tool 10 is fed into the pipeline by activating the feeding mechanisms 60, 62. The operator controls the feeding rate and distance, guided by the video monitor 6a at the ground control station 6. The local and remote cable feeding mechanisms 60, 62 feed the cable 20 in unison, the operator determining how much slack (if any) is permitted between the cable feeding mechanisms 60, 62. As the local cable feeding mechanism 60 draws the cable off of the turret 30, the reel 32 rotates and the electrical cable 112 unwinds from the turret shaft 38, kept taut by the tensioning arm 124. The operator stops the feeding mechanisms 60, 62 for closer inspection or repair of any desired portion of the pipeline 2, activating the appropriate functions of the tool 10 as required. When the operation is complete, the tool 10 may be fed further down the pipeline 2 for additional inspection or repairs, or may be withdrawn from the pipeline 2.

To withdraw the tool 10 from the pipeline 2, the operator reverses the feeding direction of the feeding mechanisms 60, 62. The umbilical cable 20 is withdrawn from the pipe 2 by the remote cable feeding mechanism 62 and loaded onto the turret 30 by the local cable feeding mechanism 60. As the turret reel 32 rotates under the force of the umbilical cable 20 being fed onto the reel 32, the electrical cable 112 winds onto the turret shaft 38 and the tensioning arm 124 is drawn toward the turret shaft 38. Each successive layer of umbilical cable 20 falls into the channel 49 formed between the fences 44, 46 and lays on top of the previous layer, until the tool 10 hits the limit switch 111 in the tool launch adapter 90, which automatically shuts off the cable feeding mechanisms 60, 62. The operator then detaches the remote cable feeding mechanism 62 from the tool launch adapter 90 and uncouples the adaptor plate 170 from the flange 94a, thus detaching the tool launch adaptor 90 from the launch saddle 92.

The tool 10 remains in the tool launch adaptor 90 where it is stored for future use. The remaining length of umbilical cord 20 can be fed onto the turret 30 by the local cable feeding mechanism 60 or by hand. The entry opening 4 is sealed in a conventional fashion, and the launch saddle 92 and gasket 99 are removed from the pipeline 2 followed by backfilling over the pipeline 2 if necessary.

The invention having been thus described by way of example only, it will be apparent to those skilled in the art that certain modifications and adaptations may be made without departing from the scope of invention, as set out in the appended claims. It will further be apparent that although the invention has been described using the example of an umbilical cable for an internal pipe repair tool, the invention can be adapted to feed any semi-rigid cable, wire, pipe, hose etc. into a conduit of any type, and the invention is in no way limited to the specific examples given herein.

We claim:

1. A cable feeding system for feeding a cable through a conduit, comprising a turret having a base and a reel rotatably mounted on the base, a local cable feeding mechanism mounted in a stationary position relative to the base for drawing the cable off of the reel, and a remote cable feeding mechanism spaced from the local cable feeding mechanism for feeding the cable into an opening in the conduit, wherein each feeding mechanism comprises two parallel sets of aligned rollers driven by a motor and spaced apart a distance approximately equal to a diameter of the cable, to frictionally engage the cable and thereby draw the cable between the two sets of rollers, the rollers within each set of rollers being synchronized by one or more transmission chains driving sprockets affixed to each roller, and the local cable feeding mechanism and the remote cable feeding mechanism are each provided with an encoder having a wheel bearing against the cable, which measures the cable drawn through the feeding mechanism, the cable feeding system being provided with means for comparing a length of cable measured by each encoder and adjusting a feeding rate of one or both feeding mechanisms so that both feeding mechanisms are synchronized to feed the cable at the same rate relative to one another.

2. The cable feeding system of claim 1 wherein the local cable feeding mechanism is attached to the turret.

3. The cable feeding system of claim 1 wherein the remote cable feeding mechanism is attached to the conduit.

4. The cable feeding system of claim 3 whereby the remote cable feeding mechanism is secured to a saddle connected to an entry opening of the conduit.

5. The cable feeding system of claim 1 including a cable containing at least one of electrical wires and fluid hoses.

6. The cable feeding system of claim 1 wherein one end of the cable is connected to a tool for inspecting or repairing a conduit.

7. A cable feeding system for feeding a cable through a conduit, comprising a turret having a base and a reel rotatably mounted on the base, and a local cable feeding mechanism mounted in a stationary position relative to the base for drawing the cable off of the reel, wherein the turret reel is mounted on a turret shaft and at least one of equipment and controls are mounted on the reel, and an electrical cable connecting a stationary operator station to the equipment or controls is wound around the turret shaft.

8. The cable feeding system of claim 7 wherein a tensioning arm tensions the electrical cable as it unwinds from the turret shaft.

9. The cable feeding system of claim 7 wherein the reel comprises inner and outer fences which are concentric and spaced apart a distance greater than a diameter of the cable but less than two diameters of the cable, the cable being loaded onto the reel into a channel formed between the two fences.

10. The cable feeding system of claim 9 wherein the reel is formed from metal tubing.

11. The cable feeding system of claim 7 wherein the local cable feeding mechanism is attached to the turret.

12. The cable feeding system of claim 7 further including a remote cable feeding mechanism spaced from the local cable feeding mechanism for feeding the cable into an opening in the conduit, whereby the local cable feeding mechanism and the remote cable feeding mechanism are synchronized to feed the cable at the same rate relative to one another.

13. The cable feeding system of claim 12 wherein the remote cable feeding mechanism is attached to the conduit.

14. The cable feeding system of claim 13 whereby the remote cable feeding mechanism is secured to a saddle connected to an entry opening of the conduit.

15. The cable feeding system of claim 7 including a cable containing at least one of electrical wires and fluid hoses.

16. The cable feeding system of claim 15 wherein one end of the cable is connected to a tool for inspecting or repairing a conduit.

* * * * *